(12) United States Patent
Knight et al.

(10) Patent No.: US 7,730,960 B1
(45) Date of Patent: Jun. 8, 2010

(54) TURF AERATION DEVICE

(75) Inventors: Harry Knight, Ethel, LA (US); Kinsey Estess, Denham Springs, LA (US); Jerry Jones, Trenton, TN (US)

(73) Assignee: The Toro Company, Bloomington, MN (US)

( * ) Notice: Subject to any disclaimer, the term of this patent is extended or adjusted under 35 U.S.C. 154(b) by 662 days.

(21) Appl. No.: 11/350,602

(22) Filed: Feb. 9, 2006

Related U.S. Application Data

(60) Provisional application No. 60/651,380, filed on Feb. 9, 2005.

(51) Int. Cl.
*A01B 45/02* (2006.01)

(52) U.S. Cl. .......................................... 172/21

(58) Field of Classification Search ................... 172/21, 172/22, 125
See application file for complete search history.

(56) References Cited

U.S. PATENT DOCUMENTS

| | | | | |
|---|---|---|---|---|
| 672,572 | A | * | 4/1901 | Schley ......................... 172/264 |
| 1,871,529 | A | * | 8/1932 | Karshner ..................... 111/118 |
| 2,056,337 | A | * | 10/1936 | Archibald ..................... 172/21 |
| 2,063,333 | A | * | 12/1936 | Nolte .......................... 172/22 |
| 2,624,254 | A | | 1/1953 | Hoover |
| 2,800,066 | A | * | 7/1957 | Cohrs et al. ................... 172/22 |
| 3,128,831 | A | | 4/1964 | Arndt |
| 3,204,703 | A | | 9/1965 | Hansen |
| 3,233,686 | A | | 2/1966 | Steadman |
| 3,480,086 | A | | 11/1969 | Groenke |
| 3,802,513 | A | | 4/1974 | Ploenges |
| 3,834,464 | A | | 9/1974 | Carlson et al. |
| 3,878,578 | A | | 4/1975 | Skudrna |
| 3,926,131 | A | | 12/1975 | Collins |
| 3,959,913 | A | | 6/1976 | Weber |
| 4,422,510 | A | | 12/1983 | de Ridder |
| 4,559,035 | A | | 12/1985 | Benjamin |
| 4,569,400 | A | | 2/1986 | Minagawa et al. |
| 4,614,239 | A | | 9/1986 | Minagawa et al. |
| 4,750,565 | A | * | 6/1988 | Hansen et al. ................ 172/22 |
| 4,753,298 | A | * | 6/1988 | Hansen et al. ................ 172/22 |
| 4,819,734 | A | * | 4/1989 | Classen ....................... 172/22 |

(Continued)

FOREIGN PATENT DOCUMENTS

DE      4001-336 A      1/1990

*Primary Examiner*—Thomas B Will
*Assistant Examiner*—Joel F. Mitchell
(74) *Attorney, Agent, or Firm*—Jones, Walker, Waechter, Poitevent, Carrere & Denegre, LLP

(57) ABSTRACT

An improved turf aeration device is provided, where the device has a frame having a journalled drive shaft, and the frame is attachable to a pulling vehicle having a power take-off portion; where the device has a power transfer means, attachable between the drive shaft and the power take-off portion, for transferring power from the power take-off portion to the drive shaft; and a plurality of aerator mechanisms operatively attached to the drive shaft and the frame, each aerator mechanism having a lower link member, with a base end and a distal end, where the base end is pivotally attached to the frame; a tine holder pivotally attached to the distal end of the lower link member, where the improvement includes a roller frame rigidly attached to the frame, the roller frame having two spaced apart, and a slideable member adapted to allow limited rotation of the aeration device toward or away from the pulling device.

10 Claims, 19 Drawing Sheets

U.S. PATENT DOCUMENTS 5,069,293 A     12/1991  St. Romain
5,207,278 A      5/1993  Hatlen
5,570,746 A  *  11/1996  Jones et al. .................. 172/22
5,709,272 A  *   1/1998  Jones et al. .................. 172/21
5,810,092 A  *   9/1998  Selvatici ...................... 172/94

* cited by examiner

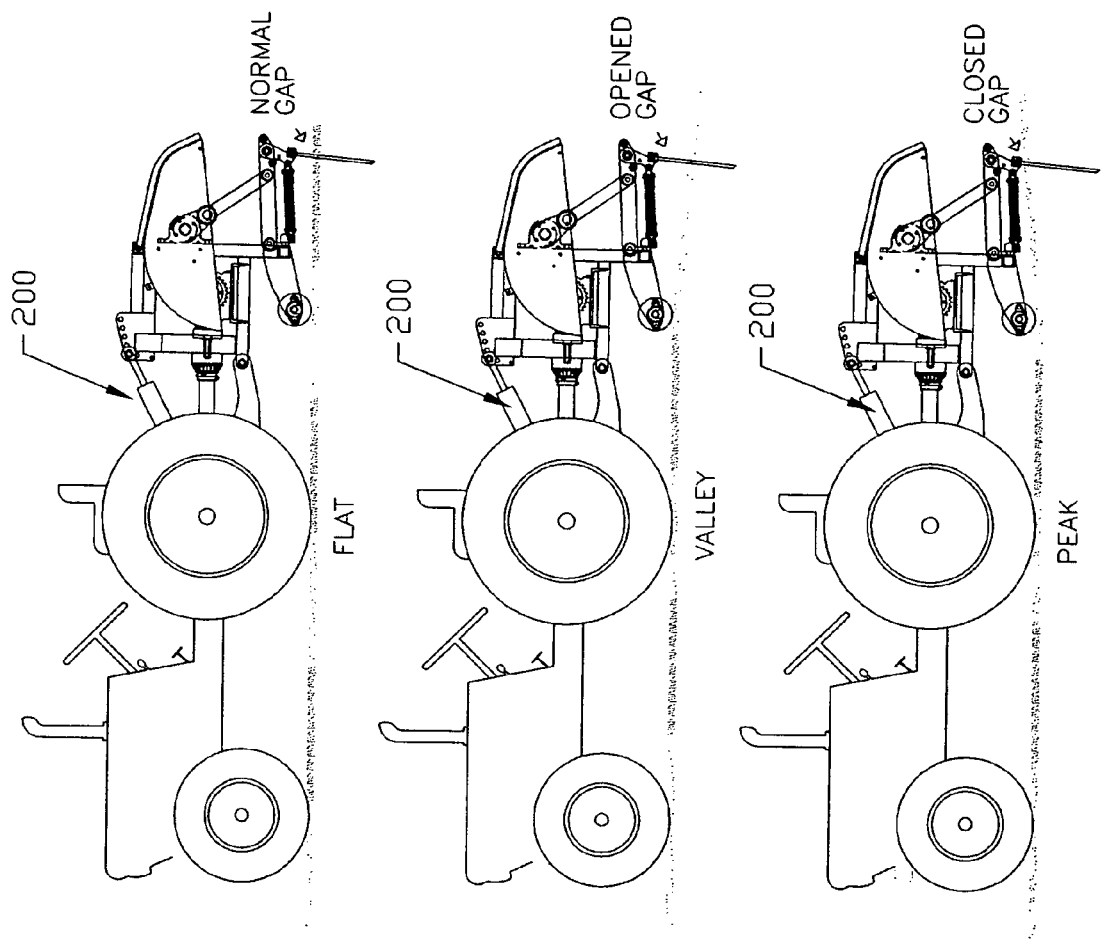
FIG. 18 – "PRIOR ART"

TURF AERATION DEVICE

This application claims priority to U.S. Patent Application Ser. No. 60/651,380 filed on Feb. 9, 2005, which is incorporated by reference herein in its entirety.

BACKGROUND OF THE INVENTION

I. Field of the Invention

The present invention relates to an improved soil aeration device.

II. Description of Prior Art

In grass fields and other lawn areas which experience sustained vehicular and pedestrian traffic, the turf surface and underlying soil can become undesirably compacted. The problems associated with soil compaction are that rain and fertilizing chemicals are prevented from fully penetrating the ground. The short-term effect of such a condition is that the field will remain soggy for longer periods after a rain, and the long-term effect is the prevention of deep and healthy root system and proper grass growth. Turf aeration is the process of creating channels in the soil so that water, air, and fertilizers can penetrate the ground and be dispersed effectively throughout the soil.

Many devices have been developed to alleviate soil-compaction problems ranging from pitchforks to heavy, tractor-pulled machinery having multiple, reciprocating tines. One tractor pulled heavy commercial device common in the industry today is the turf aerator manufactured by Verti-Drain® under U.S. Pat. No. 4,422,510 issued to de Ridder (hereinafter "de Ridder"), hereby incorporated by reference. That device teaches a main frame which supports several rotary shafts, drive links, and connecting rods which reciprocate a number of pantograph-type mechanisms. In each mechanism, a tine holder having soil-piercing tines is pivotally attached to an upper link in the mechanism, and a lower link supports a spring device which allows the tines to rotate within the soil to create a drain channel. The device is typically powered by the power take-off (PTO) drive of the pulling tractor. The chief advantage claimed by that reference is that the turf surface remains largely undisturbed because of the manner in which the path of the tines is substantially vertical during penetration and withdrawal due to the action of the pantograph mechanism. Examples of Verti-Drains are shown in FIGS. 1-5.

Another device common in the industry is the "Soil Reliever", manufactured by Southern Green, Inc. and described in U.S. Pat. Nos. 5,709,272 and 5,570,746, both incorporated by reference in their entirety. The Soil Reliever is a tractor pulled device, PTO powered, and also has a main frame supporting a rotary shaft which drives upper links. Associated with each upper link is a lower link pivotally attached to the frame. The upper link connects to the lower link to cause the lower link to reciprocate. Pivotally attached to the distal end of the lower link is a tine holder, containing a number of removable times. Attached between the tine holder 30 and the frame, below the lower link, is a spring member for biasing the spring against a stop positioned on the lower link. Examples of the Soil Reliever are shown in FIGS. 6-7.

The main frames of both the Verti-Drain device and the Soil Reliever device contains a rotatable "front" roller (shown in FIGS. 1, 5 and 7 as reference 10) attached to the main frame 6 (for reference purposes, the "front" of the aeration devise is the PTO end, that is, the end closest to the tractor). Front roller 10 is generally placed forward of the plane of the main frame, and hence, may be attached to the main frame with wings 15 as shown in FIGS. 5 and 7. Front roller 10 may be vertically adjustable as shown in FIGS. 5 and 7. Several Verti-Drain models also have a rear roller (shown as 12 in FIGS. 2, 3 and 4) positioned rearward of the plane of the main frame 6 and behind the tine heads 30. On these Verti-Drain devices, the rear roller 12 rotates in a frame 13, and the frame 13 is generally pivotally connected to the main frame 6 of the device (See FIG. 3).

Both the Verti-Drain and the Soil Reliever's main frame is connected to the tractor through a three point pick up harness on the device, generally consisting of two lower attachment points 100 rigidly connected to the main frame 6 and a top attachment point 101 also rigidly connected to the main frame 6. See generally, FIGS. 1, 5 and 8. Powered adjustment arm 200 can be powered by the PTO, hydraulics or other means, and can include an intermediate arm positioned between the tractor powered adjustment arm and top attachment point (see FIGS. 8 and 12).

Lower attachment points connect pivotally to arms on the tractor, and top attachment point 101 also pivotally connects directly or indirectly to a powered adjustment arm 200 on the tractor. The top attachment point 101 of the three point harness, as shown in FIGS. 1, 5 and 7, consists of two splayed arms 101a and a top rail 101b. The two splayed arms 101 fixedly connect at one end to the lower main frame, and at the other end to the top rail 101b. Top rail 101b is rigidly attached between the top of the main frame 6 and the two splayed arms. Additionally stiffening of the top rail 101a can be provided as shown in FIG. 12. The splayed arms 101a diverge from the top attachment point 101 to allow the PTO to attach therebetween, as shown in FIG. 5. The top attachment point 101 of the harness thus forms a rigid structure located between the bottom and top of the main frame 6, and has a coupling means 101c (as shown, a pin, but other types of couplings could be used) to couple the top attachment point 101 to the tractor's powered adjustable arm 200.

Hence, the aerator's three point harness is a rigid structure on the device but is pivotally mounted at the three connection points with the tractor or pulling vehicle. This three point harness is used in conjunction with the tractor's three point hitch system to raise and lower the aerator. When lowered or deployed, the aerator's front roller contacts the ground allowing the working end (the tines) to be placed in operational contact with the ground (shown in FIG. 6A). When lifted, the entire aerator is lifted off the ground (as shown in FIG. 6B) to allow for ease transportation of the aeration between working sites or locations.

The position of the working end of the device (the tine heads) with respect to the ground is set by adjusting the length of the pulling vehicles powered adjustment arm (or intermediary member) 200. As this arm is shortened, the coupling point 101c of the top rail 101b to the powered adjustment arm 200 is drawn closer to the tractor, thereby raising the tine heads upwardly. As this powered adjustment arm 200 is lengthened, the coupling point 101c of the top rail 101b to the powered adjustment arm 200 is pushed further from the tractor, lowering the tine heads downwardly. If the tine head is not properly positioned with respect to the ground, entry angle and depth of penetration will be improper, as shown in FIG. 18. Hence, to keep the times in proper position with respect to the ground when covering complex terrain; the tractor operator must constantly monitor and adjust the length of the top adjustment bar.

SUMMARY OF THE INVENTION

It is therefore an object of this invention to provide a turf aeration device which automatically adjusts position for changes in ground topography.

Yet another object of this invention is to provide a turf aeration device which can rotate away from the attachment points to the pulling vehicle.

It is an object of the invention to provide an aeration device having front and rear rollers connected in a rigid frame.

These and other objects and advantages of the present invention will no doubt become apparent to those skilled in the art after having read the following description of the preferred embodiment which are contained in and illustrated by the various drawing figures Therefore, in a preferred embodiment, an improved turf aeration device is provided, where the aeration device is a frame having a journal led drive shaft, wherein the frame is attachable to a pulling vehicle having a power take-off portion; power transfer means, operatively attachable between the drive shaft and said power take-off portion, for transferring power from the power take-off portion to the drive shaft; and a plurality of aerator mechanisms operatively attached to the drive shaft and the frame. Each aerator mechanism comprises a link member, having a base and a distal end, wherein the base is pivotally attached to said frame; a tine holder, having at least one tine, pivotally attached to the distal end of the link member; a resilient means pivotally connected between the frame and said the holder; the improvement is a roller frame having fixedly attached to the main frame, and two rollers (or multiple wheels) attached rotatably to the roller frame, and a means to allow the aeration device to rotate away from the pulling device.

BRIEF DESCRIPTION OF THE DRAWINGS

FIG. 18 is a schematic side view of a prior art aerator device showing the relative position of the devices components when positioned on a flat surface (top), a downward curved surface (middle drawing) and an upward curved surface (bottom drawing).

DETAILED DESCRIPTION OF THE PREFERRED EMBODIMENT

Figure 1:
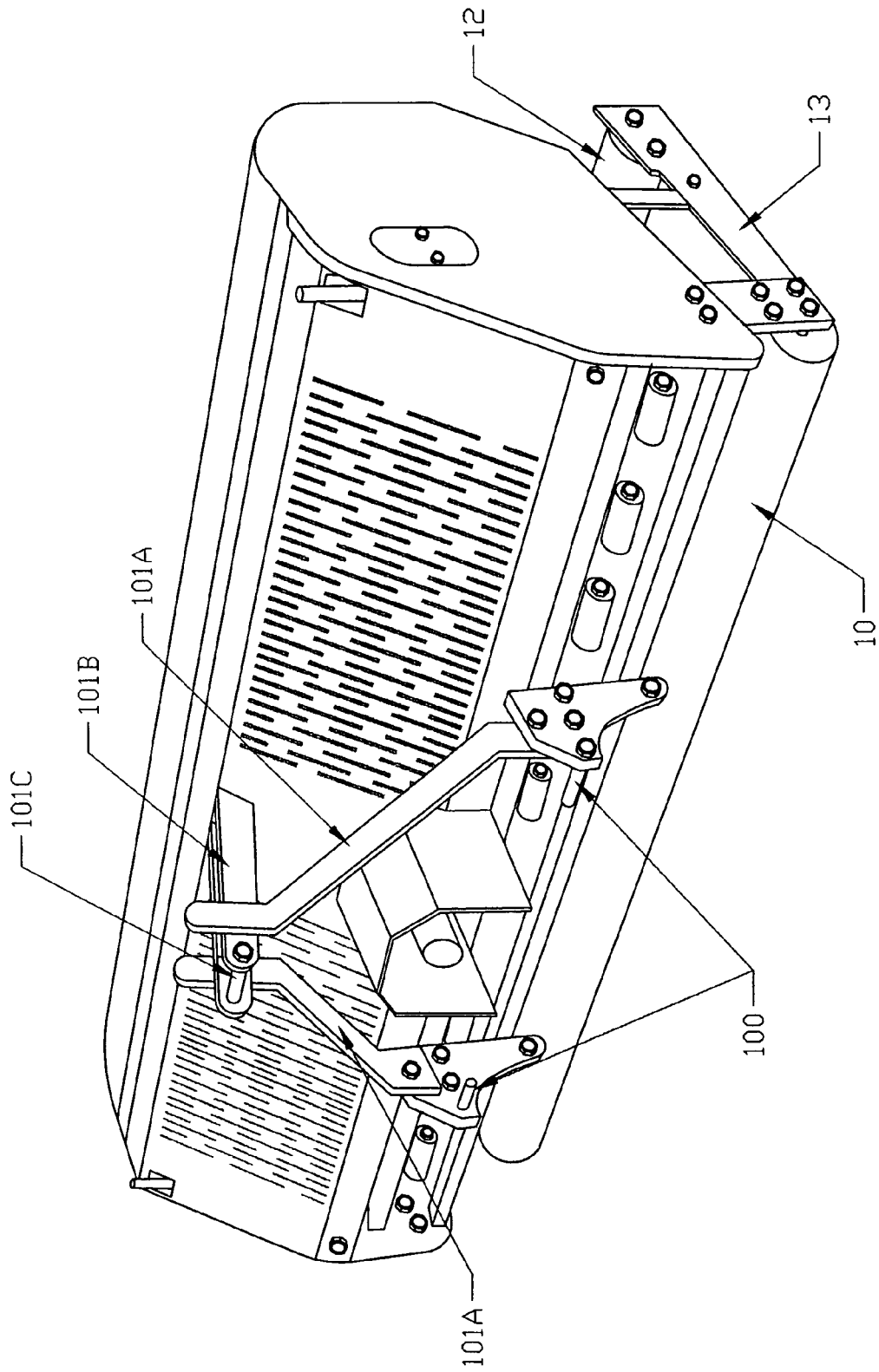
FIG. 1 is a perspective view from the front end (the tractor end) of a prior art aerator device
Figure 2:
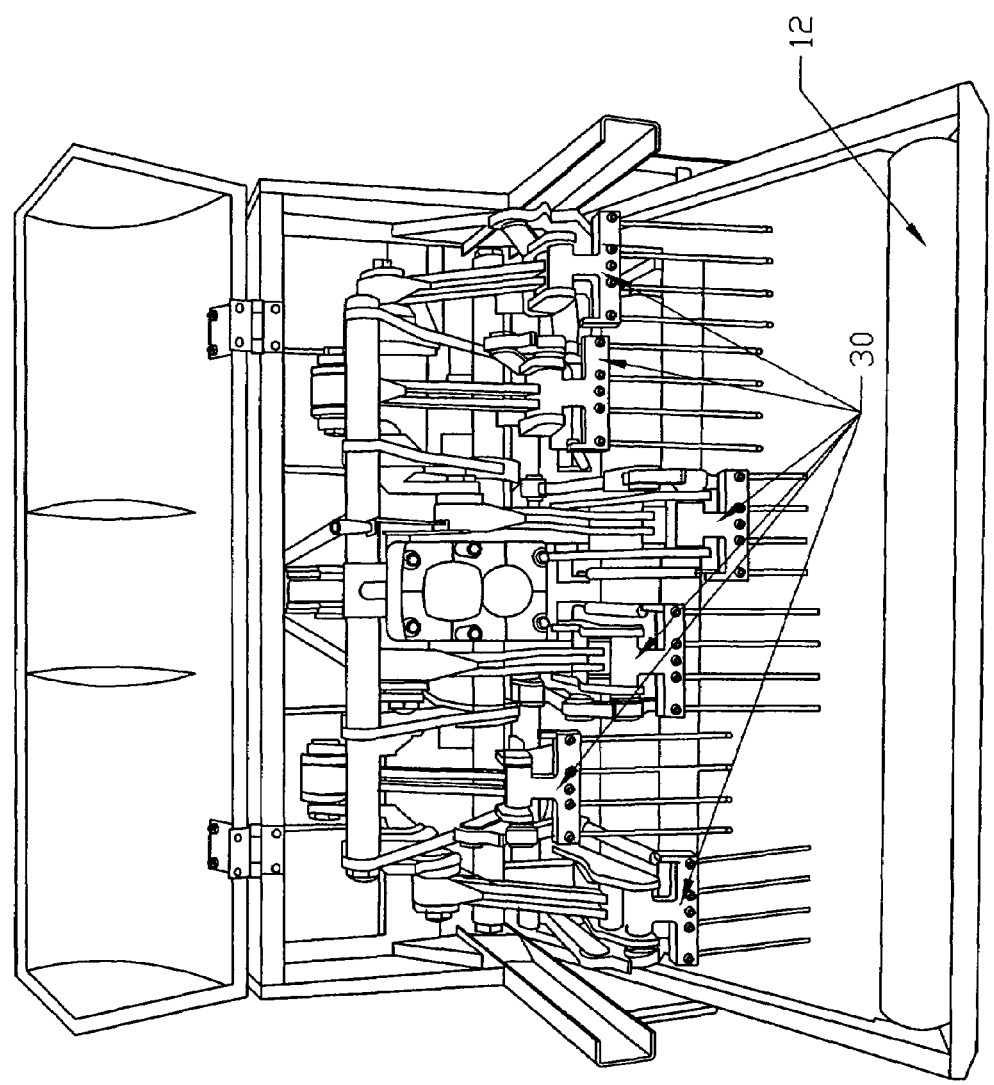
FIG. 2 is a perspective detailed view of the rear section of the prior art aerator device.

In the drawings many details pertaining to fabrication and maintenance utility well established in the machine construction art and not bearing upon points of novelty are omitted in the interest of descriptive clarity and efficiency. Such details may include threaded connections, lockrings, shear pins, weld lines and the like. Unless otherwise specified, all parts are constructed of steel or of some other material suited to performing substantially the same function described herein.

Figure 3:
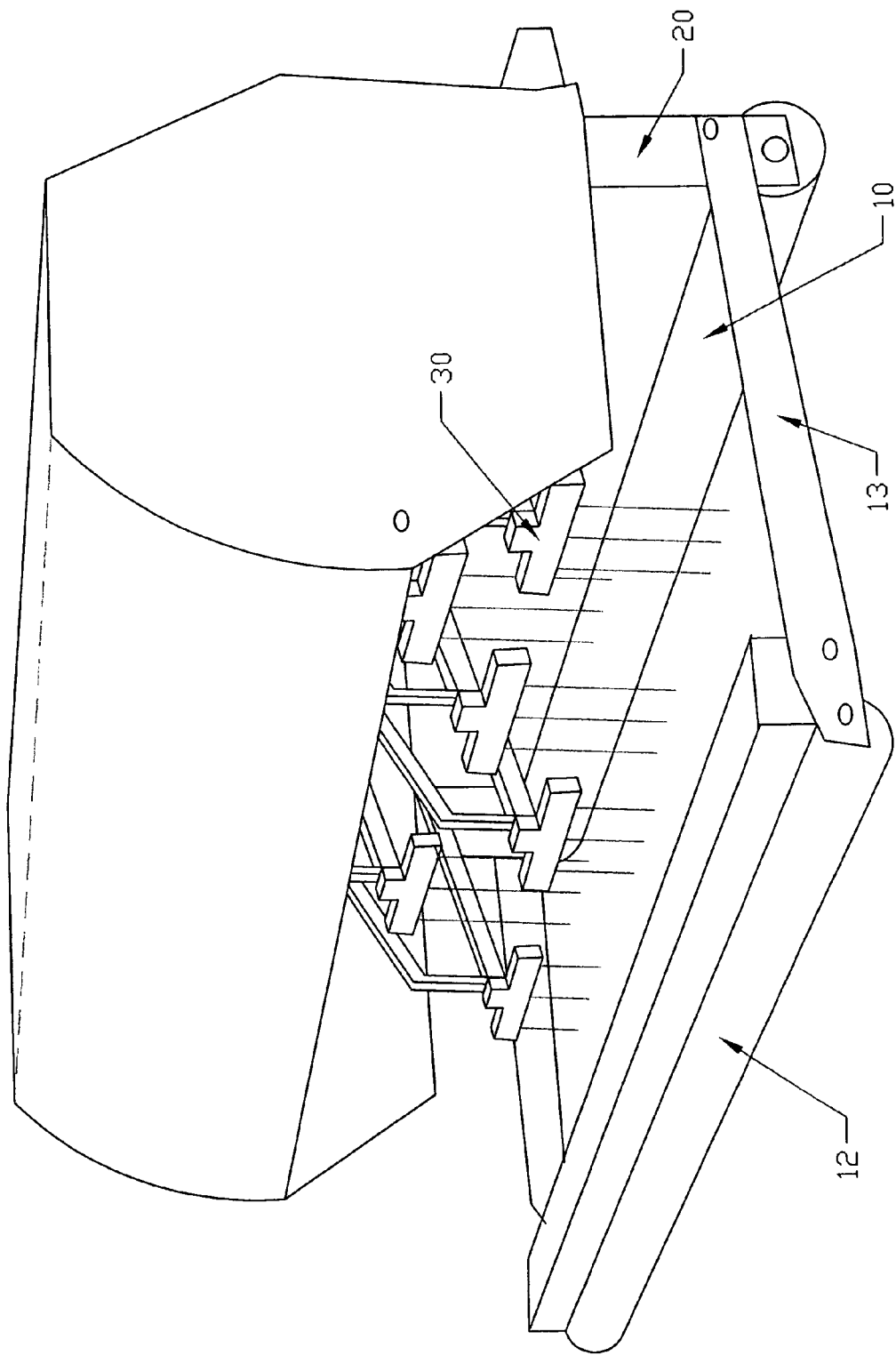
FIG. 3 is a perspective rear view of a prior art aerator device detailing a rear roller.
Figure 4:
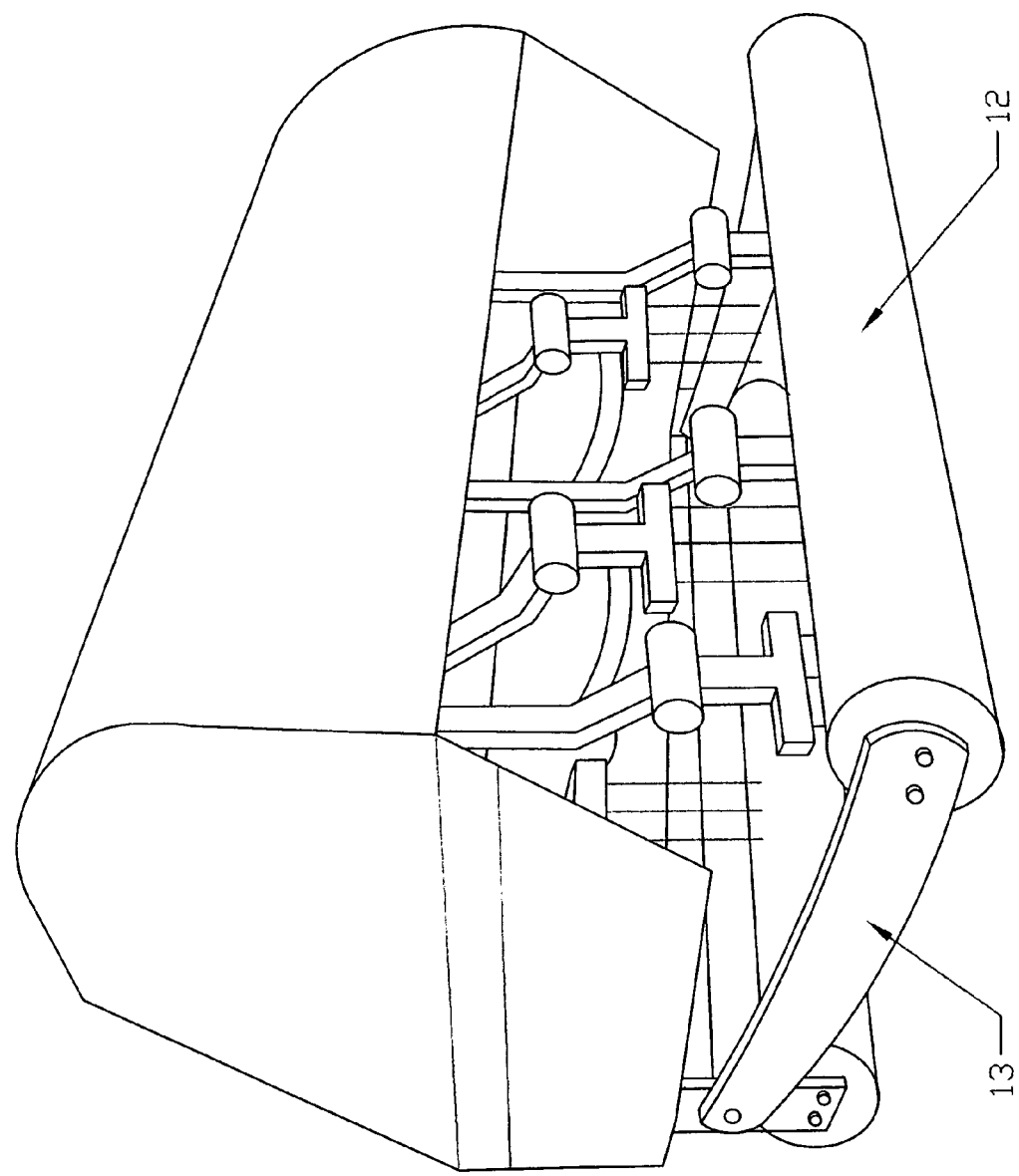
FIG. 4 is another rear prospective view of the prior art aerator device detailing a rear roller.
Figure 5:
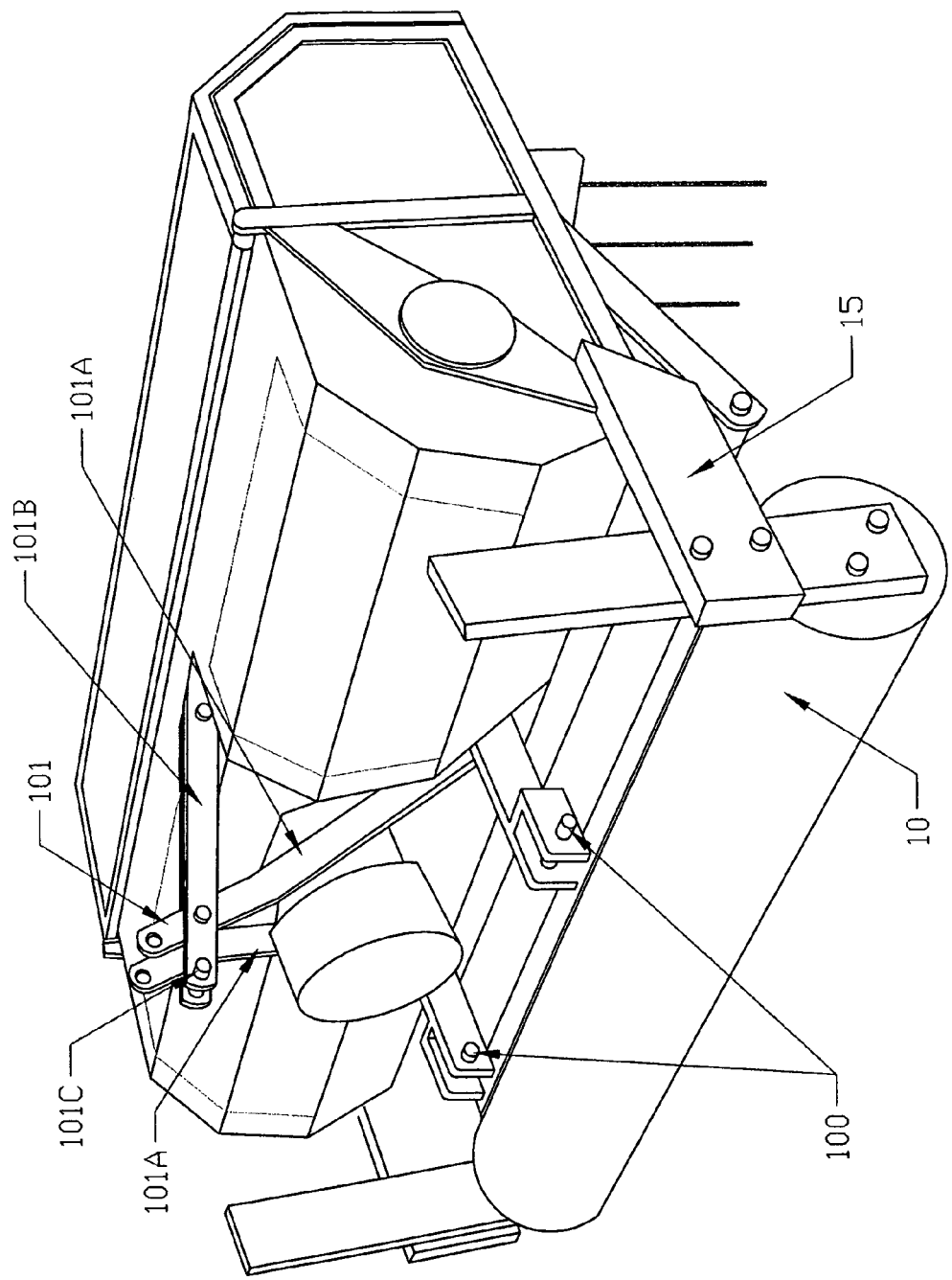
FIG. 5 is a front view of a prior art aerator device detailing a front roller.
Figure 6:
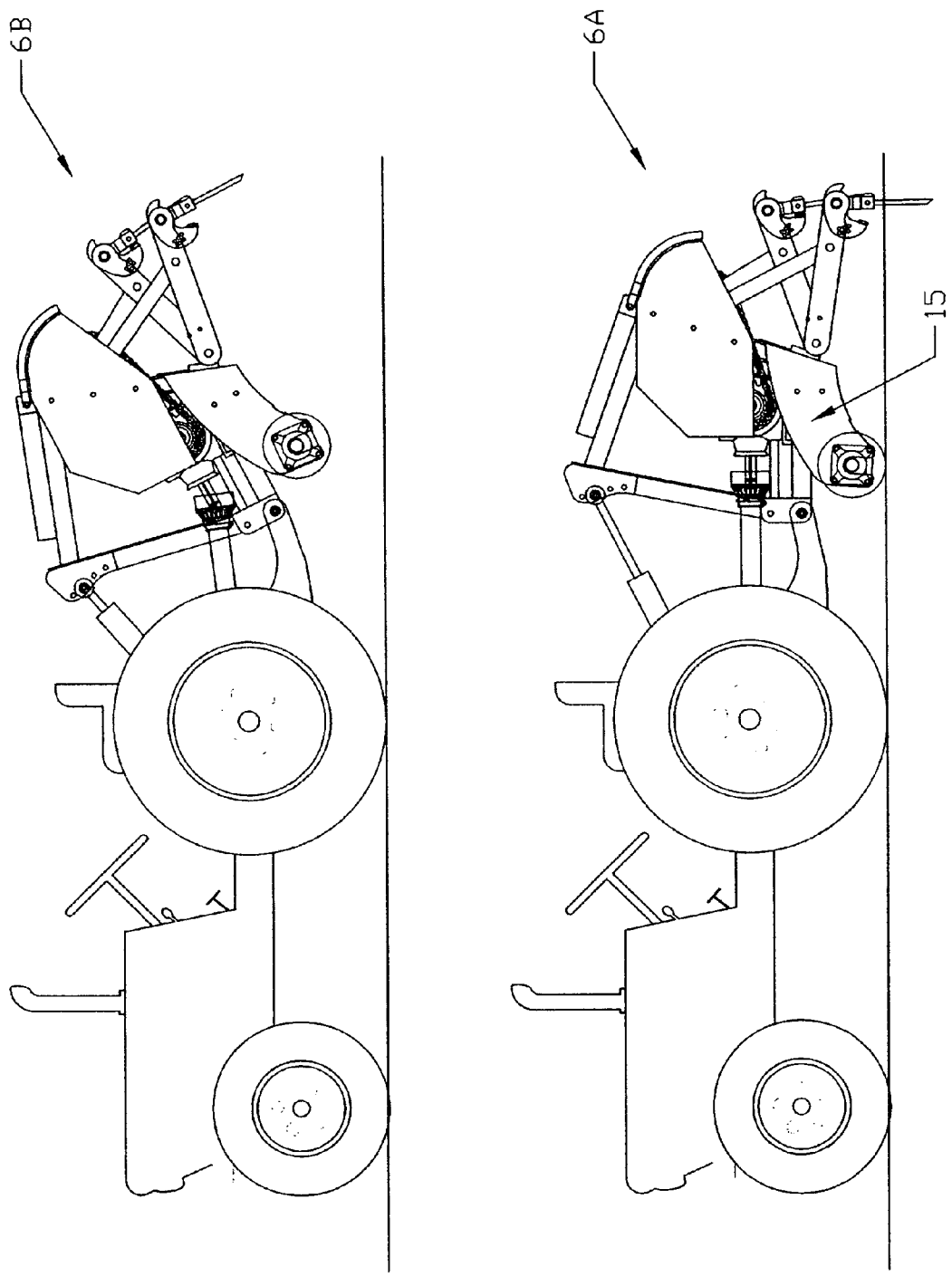
FIG. 6A is a rear perspective view of a prior art aerator device in transit position.
FIG. 6B is a rear perspective view of a prior art aerator device showing a front roller
Figure 7:
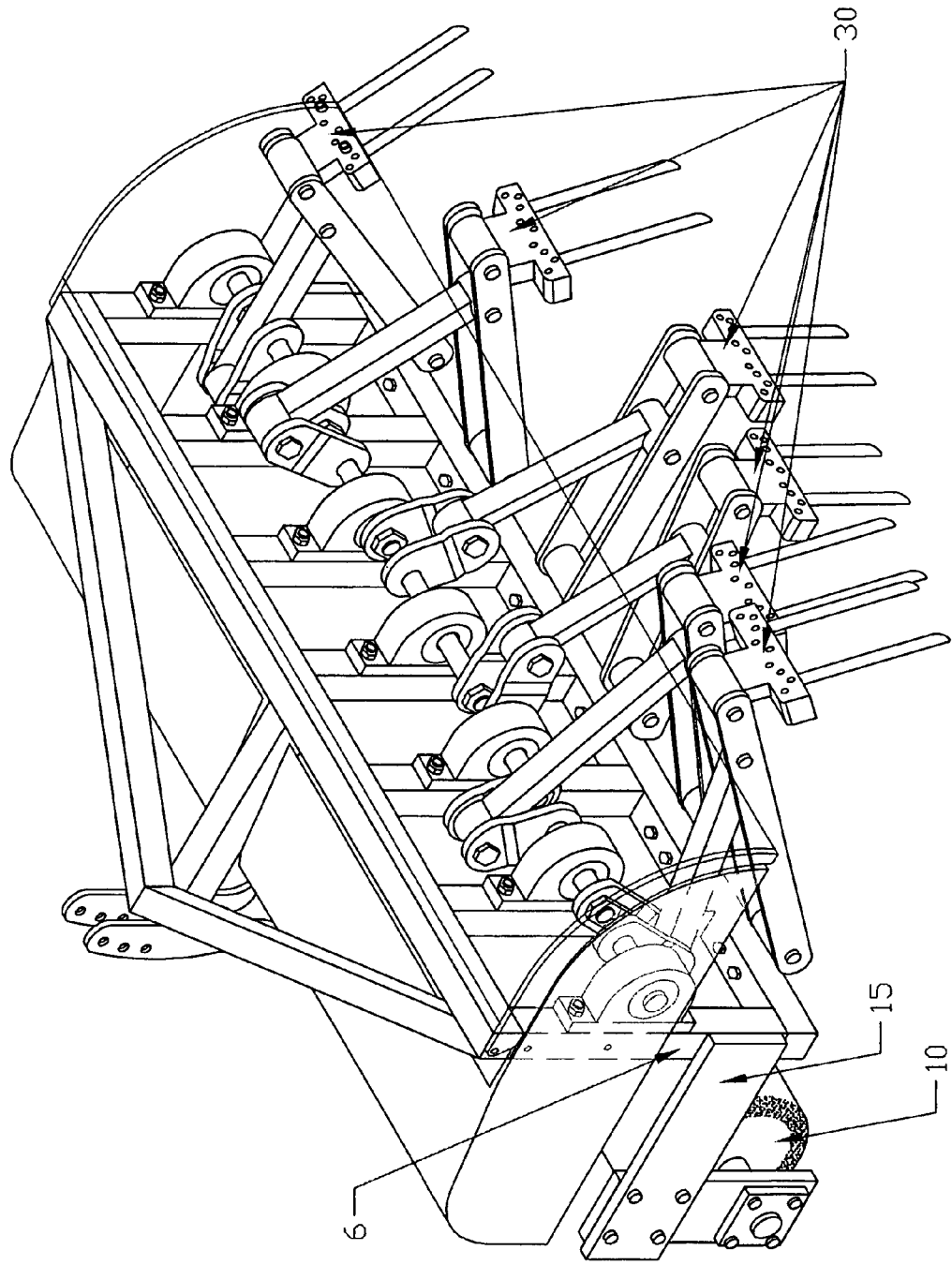
FIG. 7 is a perspective view a prior art aerator device.
Figure 8:
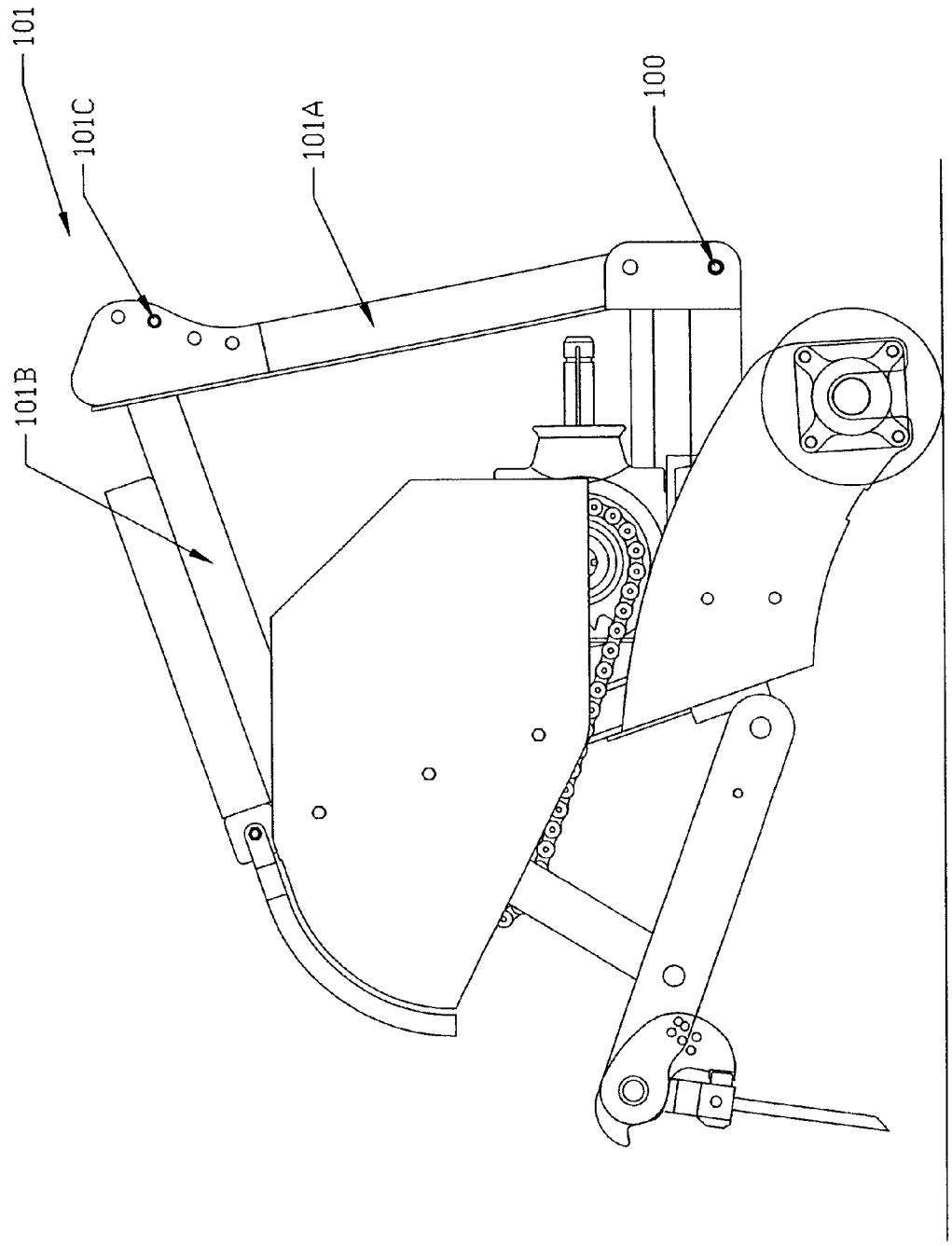
FIG. 8 is a schematic diagram of a prior art aerator device showing the rotation of the device.
Figure 9:
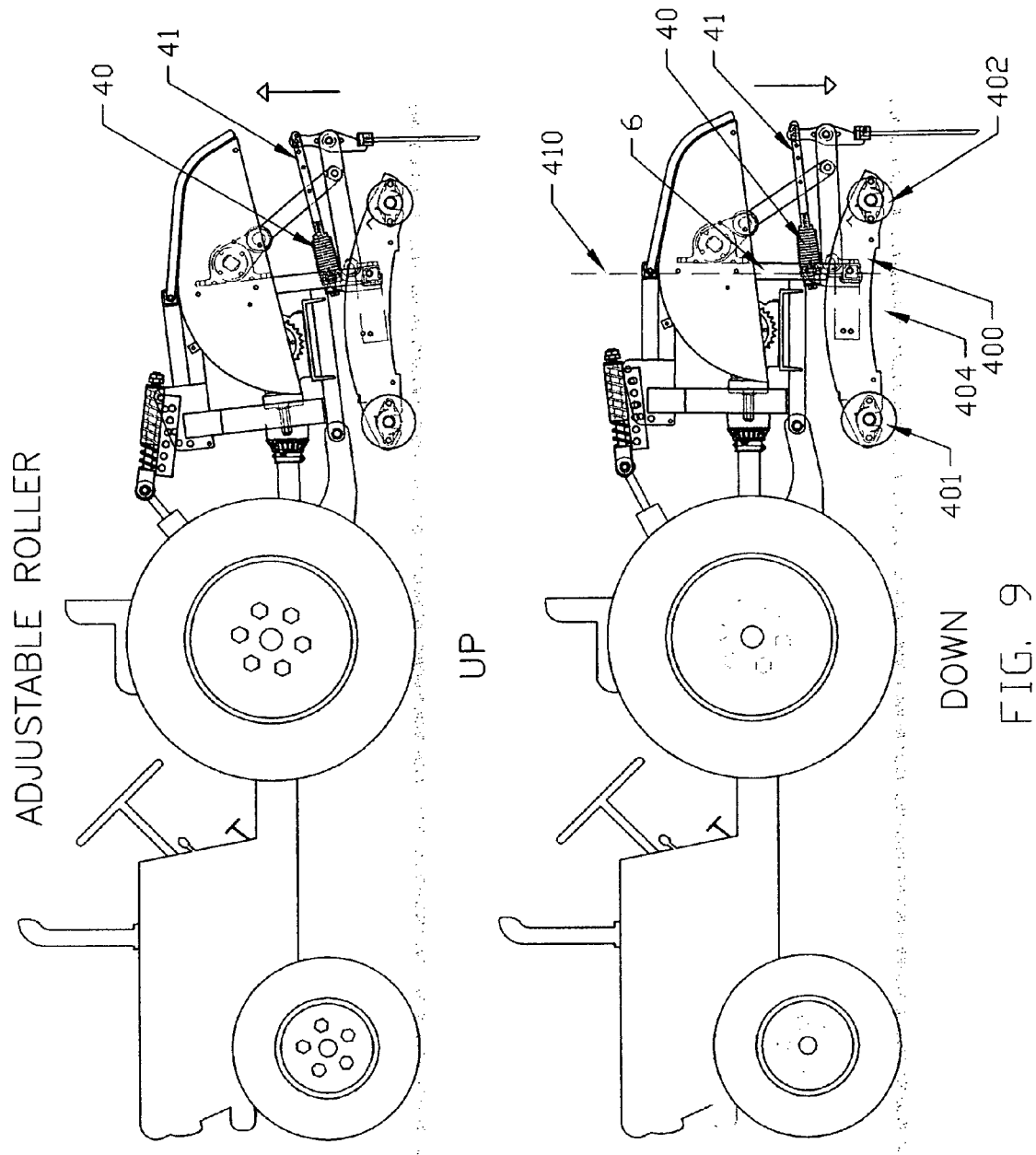
FIG. 9 is a schematic side vie of the device in two different operational positions.

Shown on FIG. 9 is one embodiment of the improved aeration device, shown pulled by a tractor. Aerator has a main frame 6. Located on the main frame 6, with a gearbox interfacing the PTO, drive shafts, drive links, aeration mechanism, and connecting rods substantially as shown in FIG. 3 of the '272 and a further description will not be repeated. As described in the '272 patent, it is preferred that the aeration mechanisms be dynamically balanced on drive shaft, and that the primary shafts exiting the gearbox connect to the driveshaft through a pair of chain and sprocket assemblies. As before, such an arrangement balances power application and the torquing forces.

Fixedly attached to main frame 6 near the frame bottom are two wings 400 (one on each side) in which front roller 401 and rear roller 402 are rotatably mounted (multiple wheels could be used instead of the two rollers, but such an embodiment is not as stiff). The rollers 401, 402 and wings 400 creates a roller frame 404, as shown, a rectangle shaped frame which is rigidly fixed with respect to the main frame 6; that is, the roller frame 404 does not pivot with respect to the main frame 6. A pivoting roller frame 404, while possible, is not preferred, as it would be difficult to control the entry angle of the tines. As the tines are located on arms connected to the main frame 6, it is desired to be able to control the relationship of the main frame 6 to the ground. By allowing the roller frame 404 to pivot, this task becomes more complicated as the entry angle of the tines would vary (with respect to the ground tangent) with surface contour, an undesirable effect. However, the roller frame 404 could be adjustably connected to the main frame 6, to allow for a fixed point of attachment, where the fixed attachment point could be varied as the job required.

Figure 10:
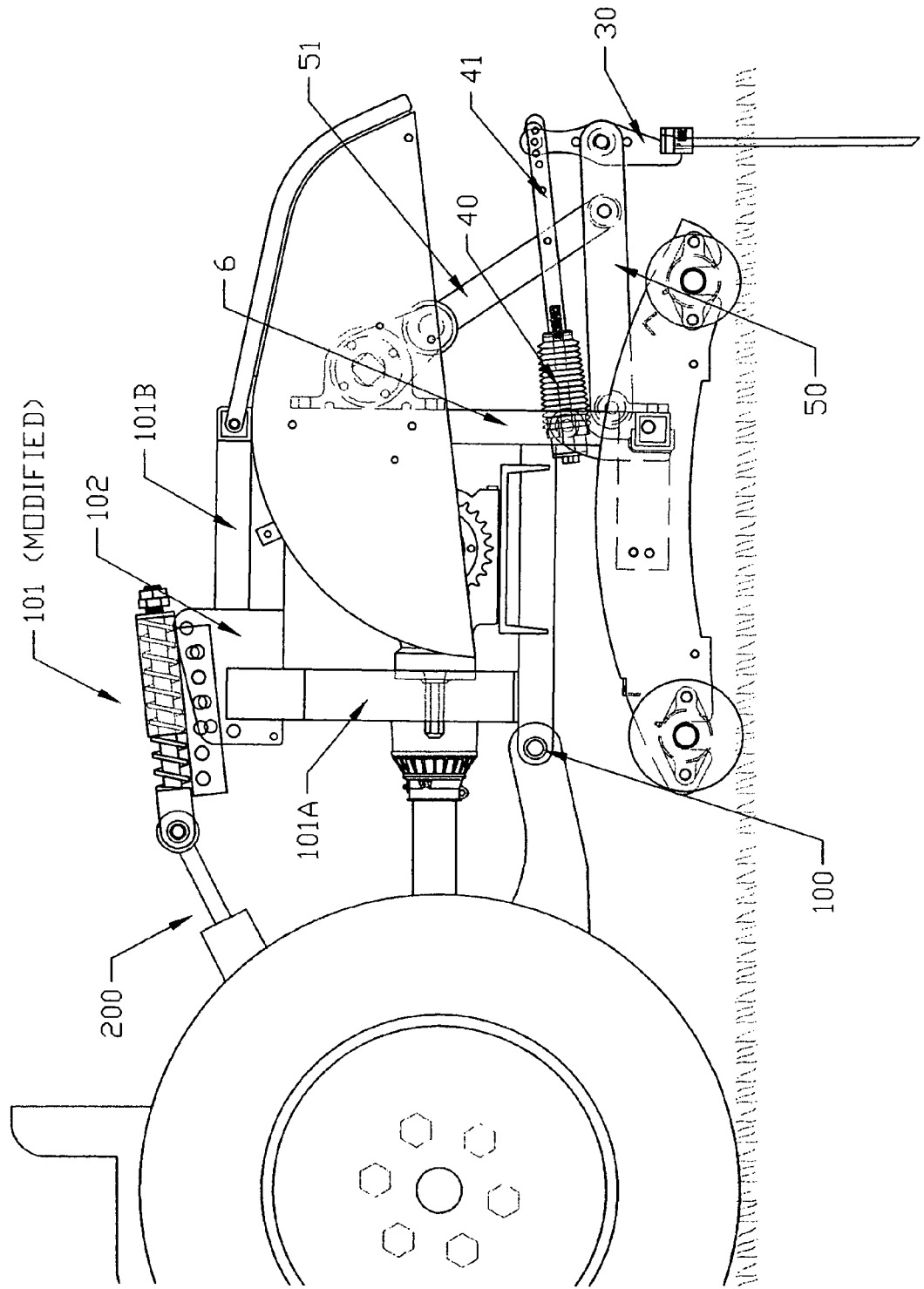
FIG. 10 is a schematic side view of the inventive device.

To position the tine head 30 (and ultimately the tines) for proper placement in the ground, a compressive spring 40 is provided on a spring arm 41 located above each lower link 50, as shown in FIG. 10. Spring arm 40 has one end pivotally connected to the tine head 30, and the other end pivotally connected to the main frame 6. The spring 40 operates to resist compression and hence, pushes the spring arm 41 rearwardly. Positioned around the spring 40 is boot 501, to protect the spring 40 from becoming clogged. Obviously, a hydraulic piston or shock could be used in place of spring 40. The rest position of the tine head 30 occurs when the spring is fully extended and the spring 40 is free from external compressive forces (hence, a tine holder stop is not required as an earlier device). The location of the spring arm 41 above the lower link arm 50 is distinct from that shown in the '272 patent, where the spring was located below the lower link arm 50 and operated to restrain the tine holder 30 when subject to tension forces (stretching). It is not possible to use a spring 40 located underneath the lower link arm 50 when using a rear roller 402 positioned very close to the tine holders 30, as the rear roller 402 would interfere with the operation of the spring. If the rear roller 402 is positioned behind the tine holder 30, an underneath spring as disclosed in the '272 patent could be used. However, such an arrangement implies a larger roller frame 404, which as will be discussed later, has disadvantages. Obviously, instead of a spring, other biasing means can be utilized, as well as the pantograph push device as disclosed in the '510 patent.

Figure 11A:
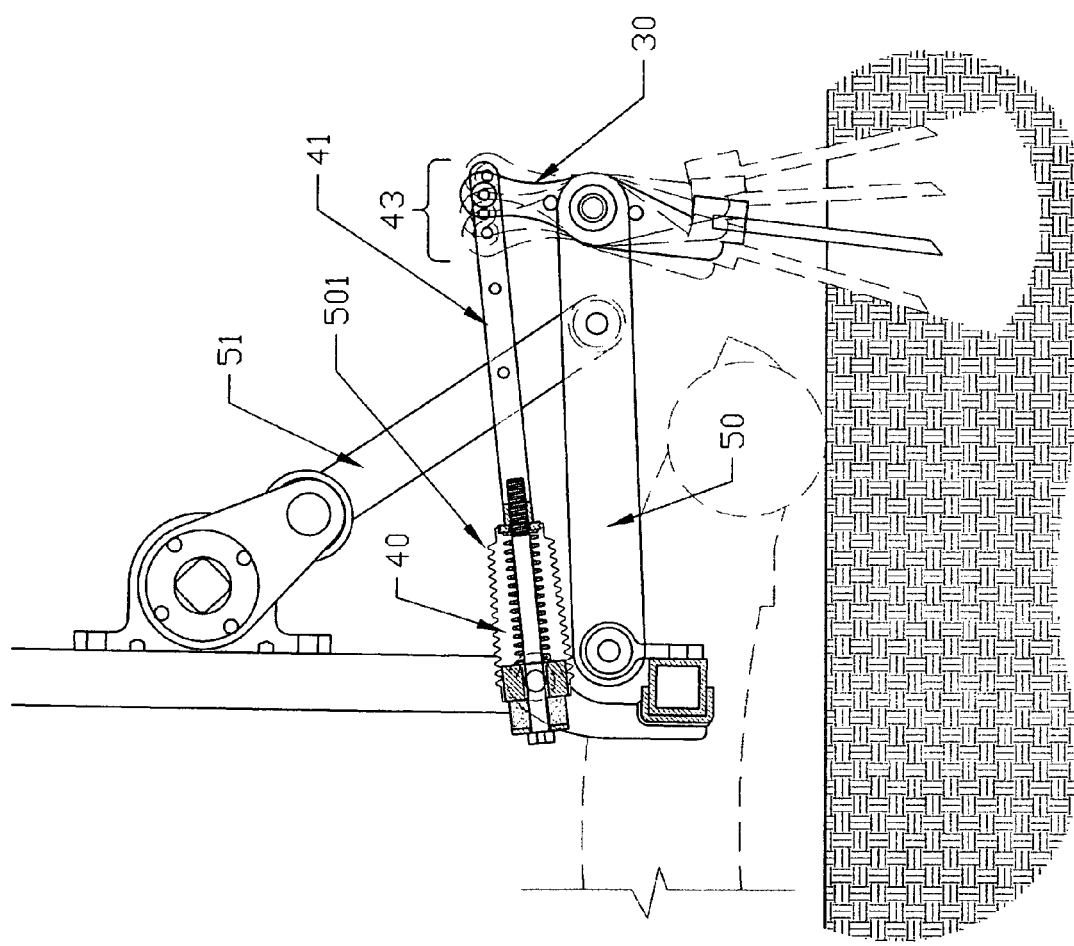
FIG. 11A is a schematic side view of the time head Camber adjustments.
Figure 11B:
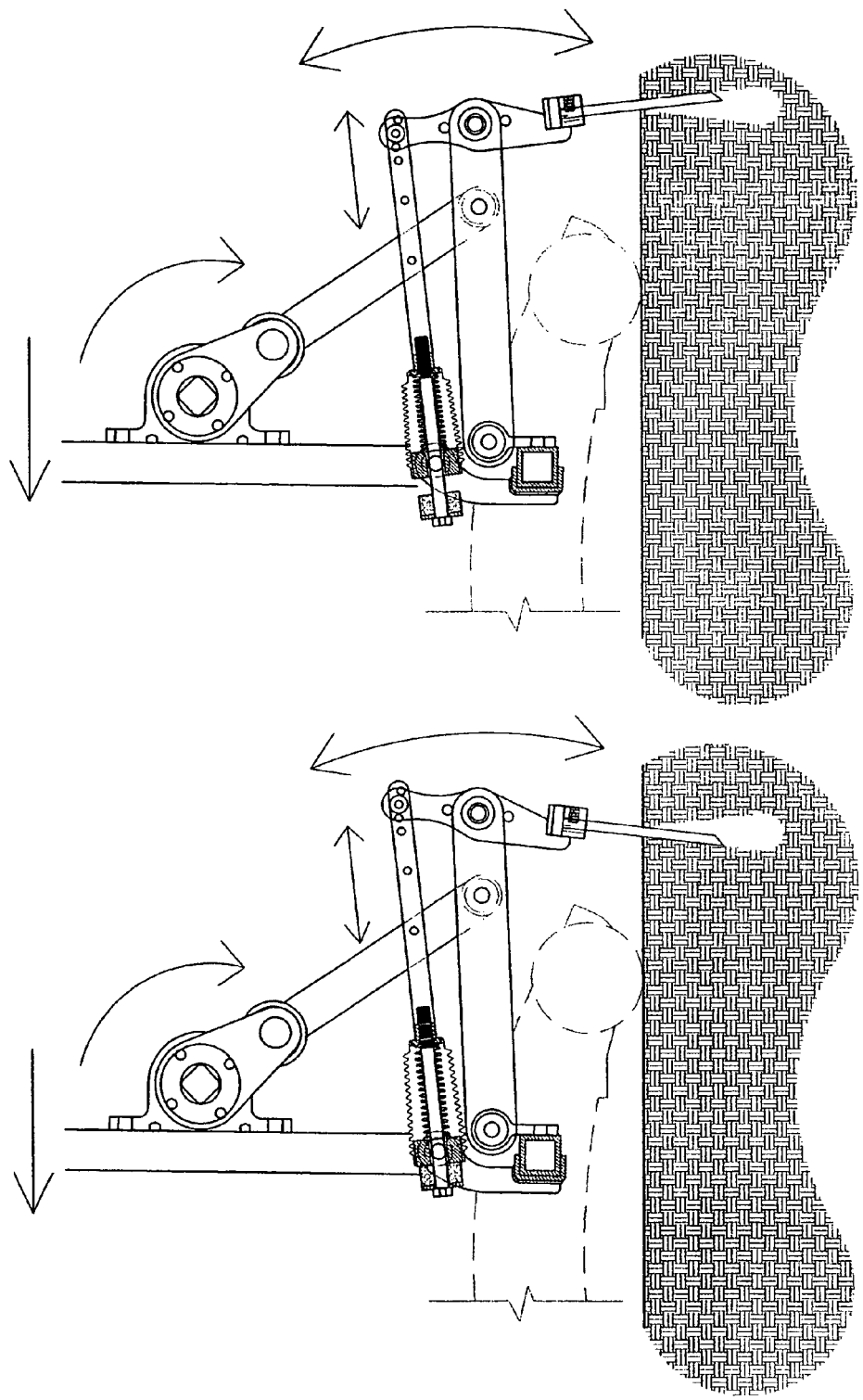
FIG. 11B is a schematic side vie of the time head showing the operation of the spring system.
Figure 12:
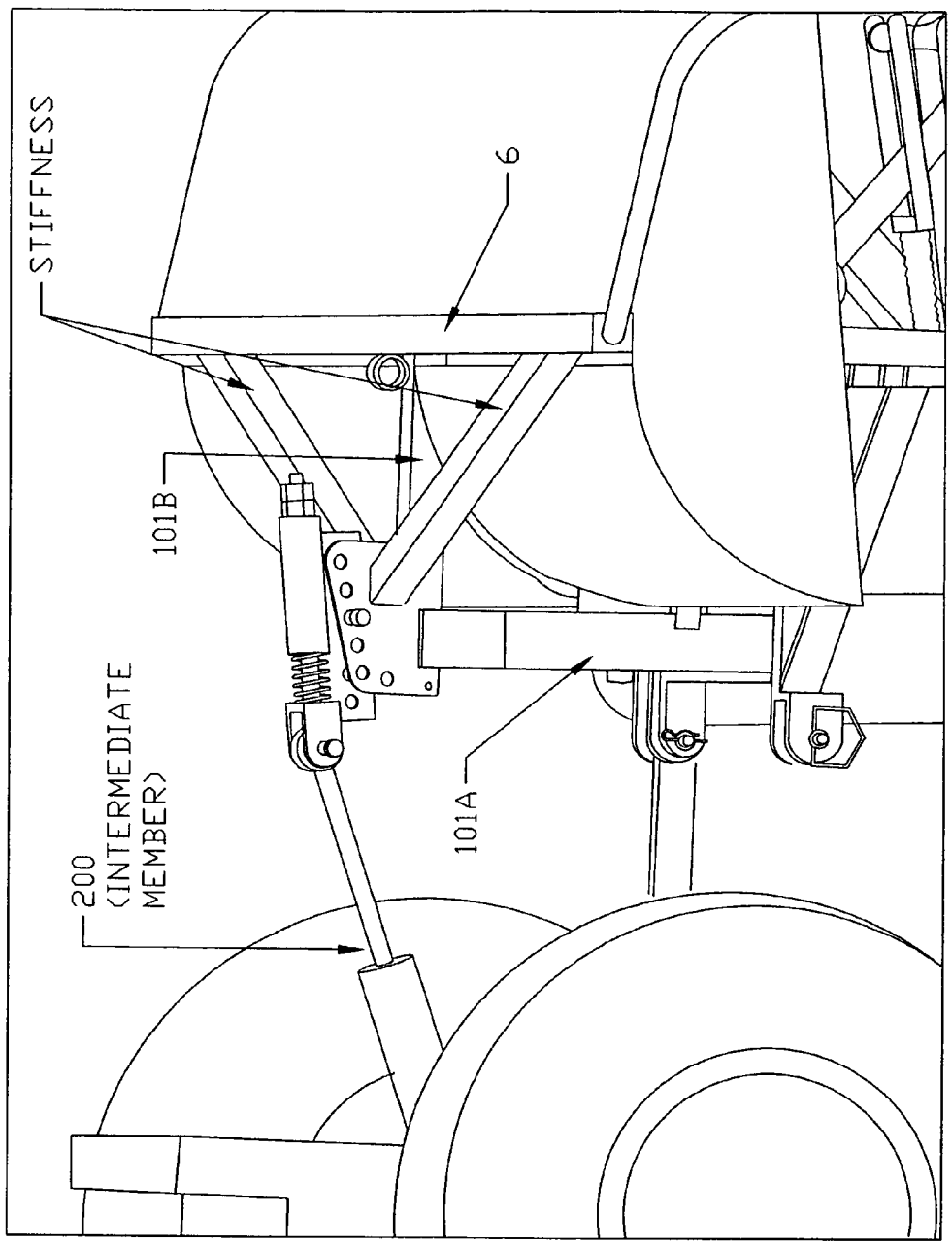
FIG. 12 is a top perspective view of the device showing the top spring an intermediate member.
Figure 13:
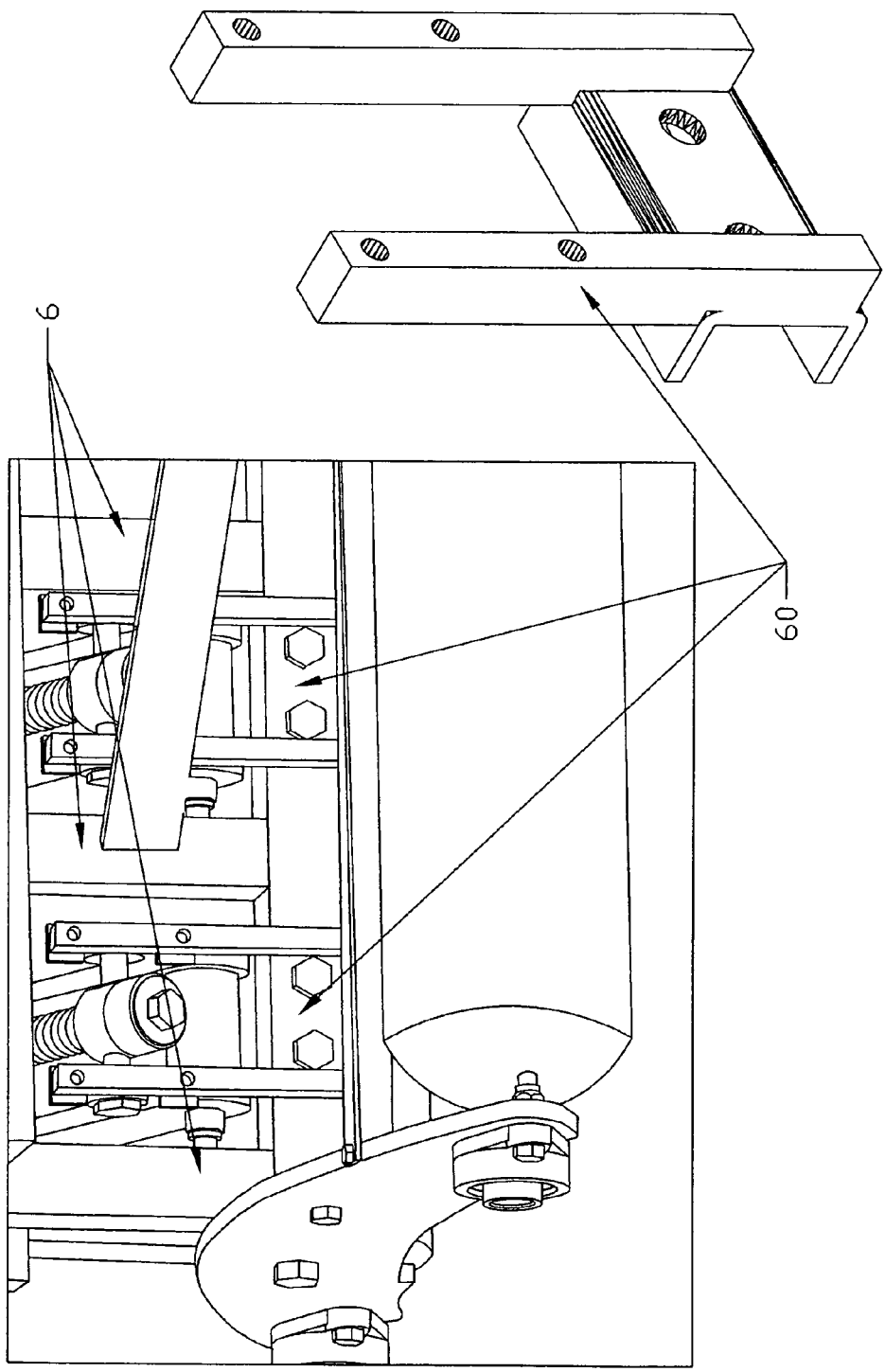
FIG. 13 is a detail perspective view of the spring attachment to the frame.

Also as shown in FIG. 11A, the end of the spring arm 41 has a series of holes 43 positioned therethrough for varying the positioned of the tine holder 30 with respect to the spring arm 41, thereby allowing one to modify the "rest" position of the tine holder to set the entry angle of the tines as needed for the particular application. Additionally, it is desired to mount the spring in a separate attachable bracket 60 positioned on the frame, to allowed for ease of removal, as shown in FIG. 13. The compression of the spring or biasing member for entry and exit of the tines is shown in FIG. 11B. As shown, the spring motion in combination with the aeration device's motion results in a pivoting of the buried tine, helping to fracture the ground, enlarging the bottom of the penetration hole.

The main frame 6 and roller frame 404 provides a rigid structure that will follow the ground contours provided that the entire main frame structure 6 is free to rotate away from or toward the tractor. While the current designs of attachment systems allows the aerator to pivot about the attachment points, the aeration is not free to rotate in the plane of the pulling direction (toward or away from the tractor). One possibility to provide the needed degree of freedom would be to disconnect the tractor's powered adjustment arm 200 from the top arm 101*b* of the main frame's three point harness system 101. In this fashion, the bottom of the main frame is allowed to pivot, and the top is free to rotate in the desired fashion: the main frame 6 is free to rotate about the lower attachment points 100 on the main frame 6. Simply dispensing with this particular attachment point has drawbacks: the aerator cannot be placed in the raised position by action of the three point hitch system on the tractor. In this instance, upon raising the three point harness on the tractor, the aerator would flop downward (that is, it would continue to rotate rearwardly) without being lifted off the ground.

Figure 14:
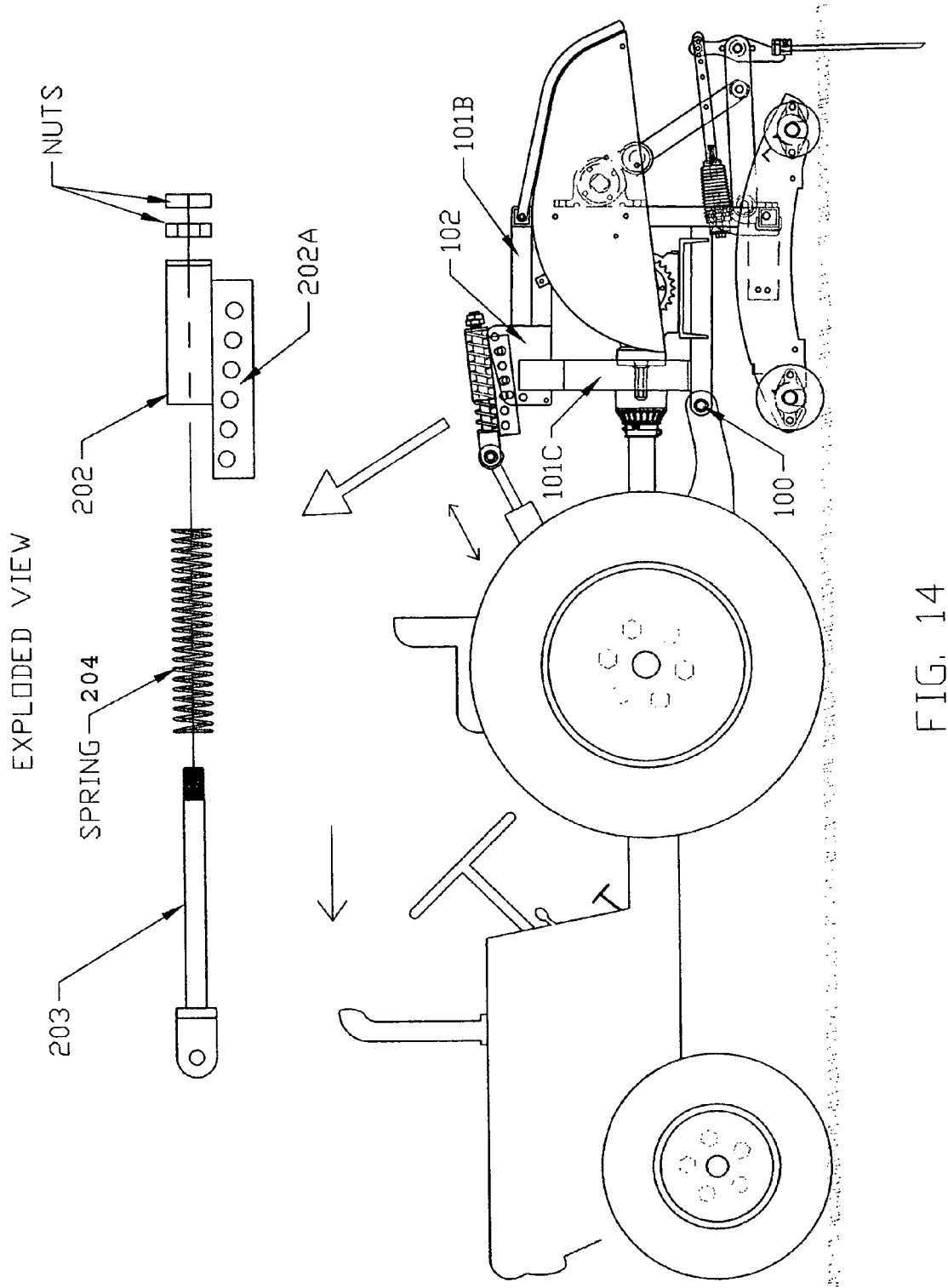
FIG. 14 is a schematic side view with exploded detail of the top coupling means.
Figure 15:
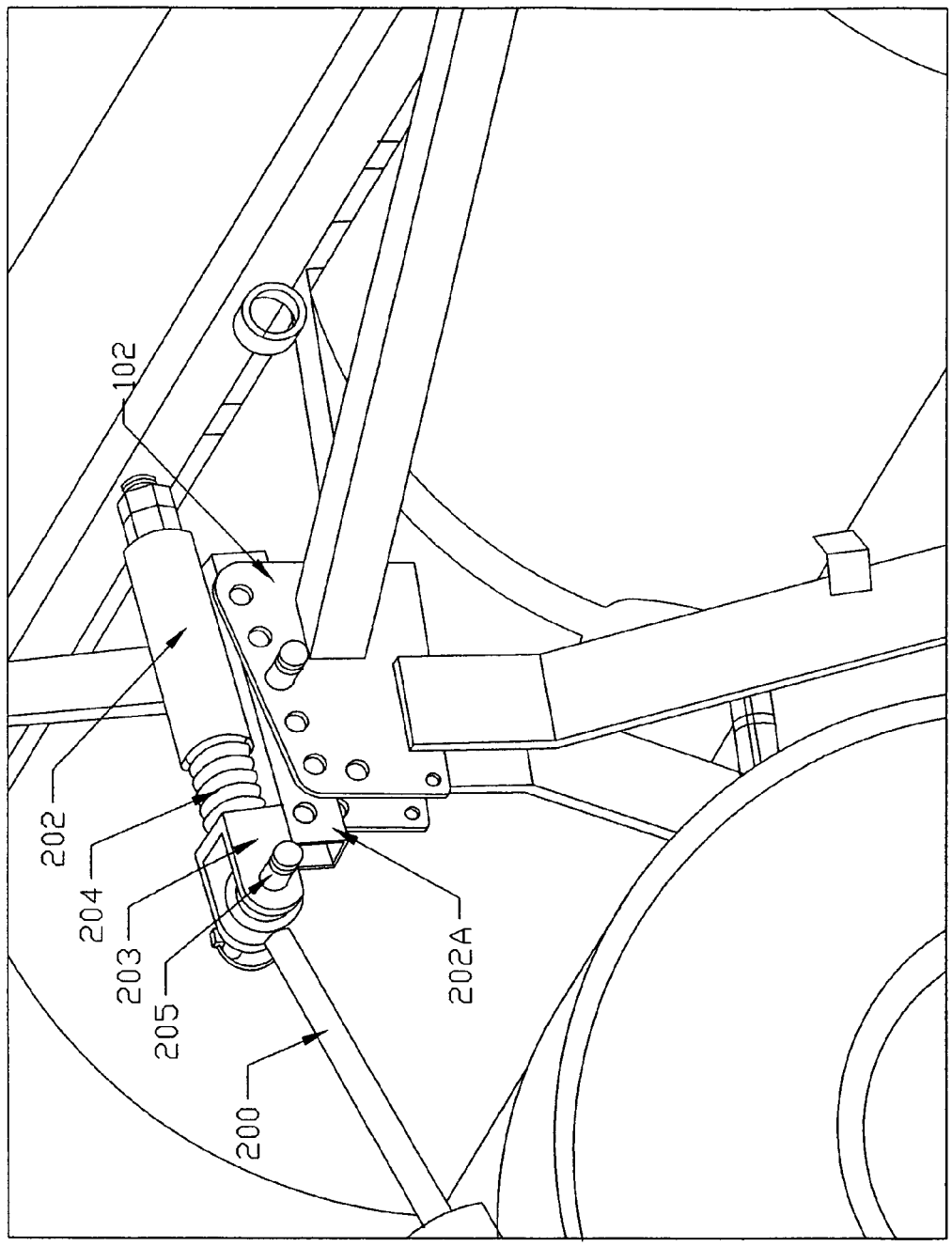
FIG. 15 is a detailed prospective view of the top coupling means.
Figure 16:
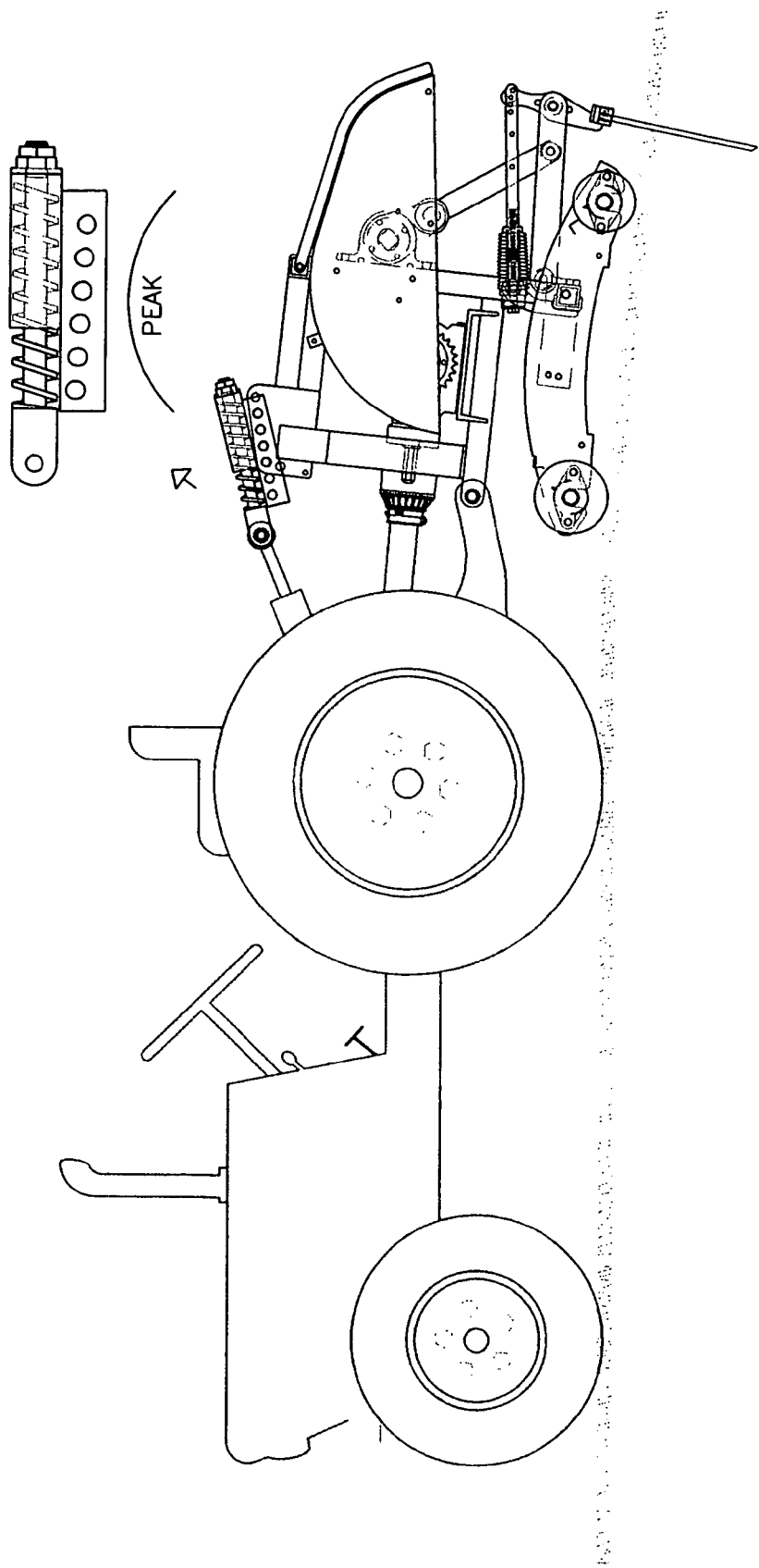
FIG. 16 is a schematic side view showing the relative position of the device's components when positioned on a downward curved surface.

To provide for a limited range of rotation, the coupling means 101C at the top attachment point 101 is modified to provide a means to provide limited rotation of the aeration device. As shown in FIG. 14, the means provided includes a spring retainer 202. The retainer 202 has a protruding plate 202A with a series of openings to allow for bolting of the plate 202A to a matching set of openings on a plate member 102 positioned on the distal end of the attachment point 101. As shown, the openings in plate member 102 are located in a channel formed by two plates, more clearly shown in FIG. 15. Bolted into this channel 102 is plate 202A. The position of the spring retainer 202 can be shifted forward or rearwardly in response to the degree of rotation desired. As shown, plate 102 is angled to more closely align with the angle at which the power adjustment arm or intermediary member connects to the coupling means 101C.

A spring arm 203 and spring 204 are positioned partially in the spring retainer 202, as shown in the detail of FIG. 14. The spring arm is essentially a member slidable on the frame in a direction toward or away from the tractor. The slidable member could be a pin, plate, shock, etc. The distal end of the spring arm 203 is threaded, to allow a nut to be placed on the arm as it protrudes from the spring retainer 202. The near tractor end of the spring arm has a coupling joint 205 (as shown, aligned holes and a pin) to couple to the power attachment arm (or intermediary arm) of the tractor's three point hitch system to the spring retainer 203.

Figure 17:
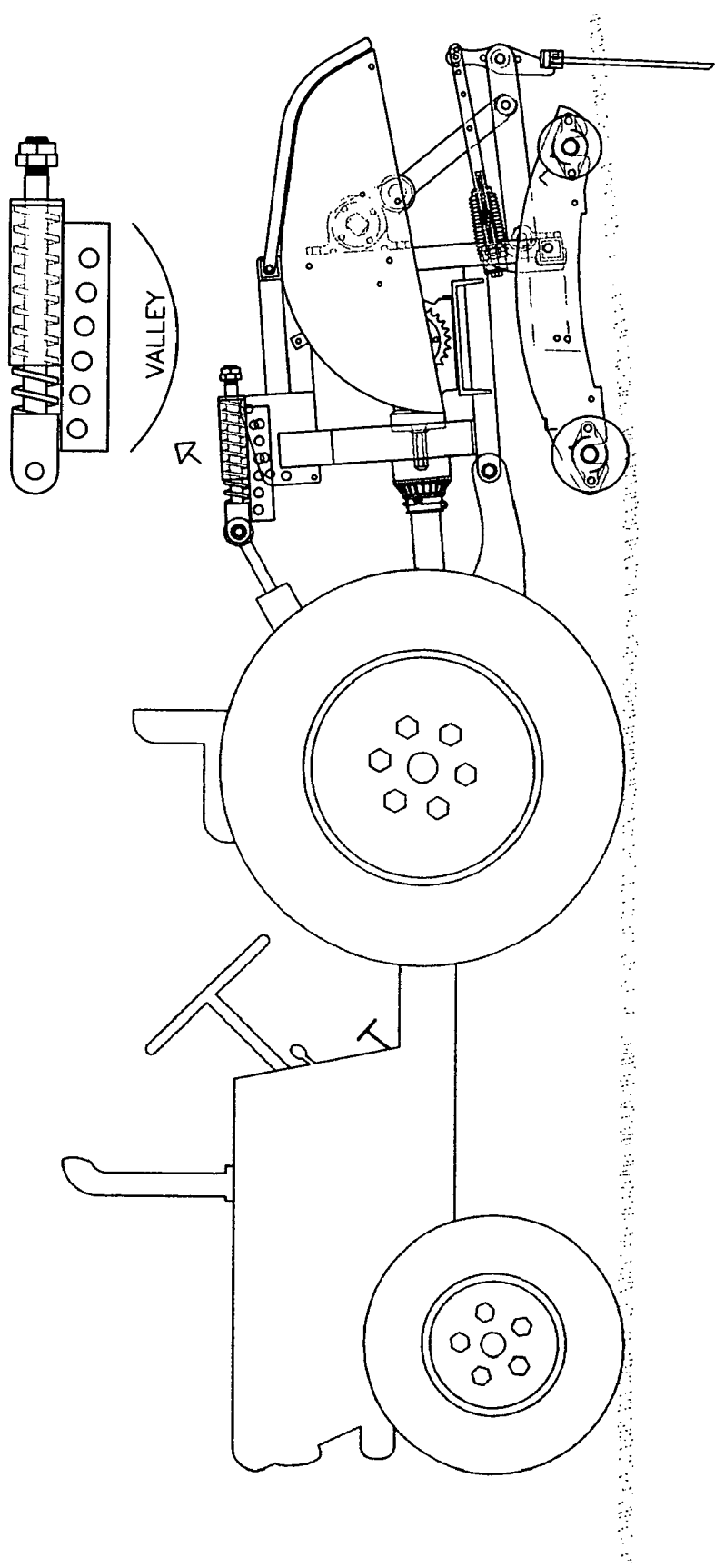
FIG. 17 is a schematic side view showing the relative position of the device's components when positioned on an upward curved surface.

In operation, as the tractor traverses over a valley, the main frame 6 and roller frame 404 will rotate forwardly (toward the tractor) as shown in FIG. 17. Rotation is allowed by the spring retainer 202 moving forwardly with respect to the spring arm 203, and results in compression of the spring 204. The desired rotation could be achieved without use of the spring 204 (as the weight of the device is sufficient to provide for rotation) but the spring 204 helps damp the forces and prevents the spring arm 203 from slamming into the spring retainer 202, potentially causing damage. As the tractor traverses over a ridge, the main frame and roller frame rotate rearwardly, reversing the operation, as shown in FIG. 17.

The amount of allowed rotation depends on the length of the spring arm (as shown about 12 inches) and the mount location of the spring retainer 202 on the plate(s) 102. Additionally, the ability of the frame 6 to follow the contours of the ground will depend upon the footprint of the roller frame 404. For instance, a small roller frame 404 (as shown in FIG. 10, the distance separating the rollers is about 27 inches) is more readily able to follow local features as opposed to a larger roller frame (say 48 inches, with the rear roller located behind the tine holder). While a larger roller frame 404 (including placing the roller in front of the tine heads are possible), it is preferred where features vary rapidly, such as on golf courses.

Although the present invention has been described in terms of specific embodiments, it is anticipated that alterations and modifications thereof will no doubt become apparent to those skilled in the art. For example, it will be understood that by keeping the top attachment point only a pivot point, and placing springs and spring arms at the bottom attachment points of the three point harness, comparable rotation of the frame is achieved (here rotation about the top attachment point). It is therefore intended that the following claims be interpreted as coveting all such alterations and modifications as fall within the true spirit and scope of the invention.

We claim:

1. In a turf aeration device comprising a frame having a drive shaft, wherein said frame is attachable to a pulling vehicle having a power take-off portion; where the device has a power transfer means, operatively attachable between said drive shaft and said power take-off portion, for transferring power from said power take-off portion to said drive shaft; and a plurality of aerator mechanisms operatively attached to said drive shaft and said frame, each said aerator mechanism comprising a lower link member, having a base end and a distal end, wherein said base end is pivotally attached to said frame; a tine holder, adapted to hold at least one tine, pivotally attached to said distal end of said lower link member, wherein the improvement comprises a roller frame rigidly attached to said frame, said roller frame further comprising a rolling means positioned for ground contact when said turf aeration device is deployed in an operating position, and a means to allow limited rotation of the aeration device toward or away from the pulling device, whereby said means to allow limited rotation allows said rolling means to automatically adjust to ground contours when said turf aeration device is deployed in an operating position thereby rotating said frame toward or away from an attached pulling vehicle.

2. The improved turf aeration device according to claim 1 wherein said rolling means further comprises a front and a rear roller.

3. The improved turf aeration device according to claim 1, wherein said rolling means further comprises a plurality of wheels.

4. The improved turf aeration device according to claim 1, wherein said means to allow limited rotation of the aeration device toward or away from the pulling device further comprises a slidable member slidably attached to said frame and operatively connectable to a pulling vehicle.

5. The improved turf aeration device according to claim 4, wherein said slidable member further comprises a biasing device.

6. The improved turf aeration device according to claim 5 wherein said slidable member further comprises a pin and said biasing device includes a spring.

7. The improved turf aeration device according to claim 6 wherein said turf aeration device includes a three point harness, having two attachment point positioned on a bottom portion of the frame and a top attachment point positioned on a top portion of the frame, and wherein said slidable member is positioned at said top attachment point.

8. An improved method of aeration, consisting of attaching a turf aeration device to a pulling vehicle, where said turf aeration device comprises a frame having a drive shaft, wherein said frame is attachable to a pulling vehicle having a power take-off portion; where the device has a power transfer means, operatively attachable between said drive shaft and said power take-off portion, for transferring power from said power take-off portion to said drive shaft; and a plurality of aerator mechanisms operatively attached to said drive shaft and said frame, each said aerator mechanism comprising a lower link member, having a base end and a distal end, wherein said base end is pivotally attached to said frame; a tine holder, adapted to hold at least one tine, pivotally attached to said distal end of said lower link member, a roller frame rigidly attached to said frame, said roller frame having a rolling means positioned for ground contact when said turf aeration device is deployed in an operating position, and a means to allow limited rotation of the aeration device toward or away from the pulling device, whereby said means to allow limited rotation allows said rolling means to automatically adjust in response to ground contours when said turf aeration device is deployed in an operating position thereby rotating said frame toward or away from an attached pulling vehicle, said method further comprising the steps of installing tines in said tine holders, positioning said turf aeration device on the ground, and moving forward, pulling said turf aeration device across the ground.

9. A turf aeration device comprising a frame having a drive shaft, wherein said frame is attachable to a pulling vehicle having a power take-off portion; where the device has a power transfer means, operatively attachable between said drive shaft and said power take-off portion, for transferring power from said power take-off portion to said drive shaft; and a plurality of aerator mechanisms operatively attached to said drive shaft and said frame, each said aerator mechanism comprising a lower link member, having a base end and a distal end, wherein said base end is pivotally attached to said frame; a tine holder, adapted to hold at least one tine, pivotally attached to said distal end of said lower link member, and a roller frame rigidly attached to said frame, said roller frame having a rolling means positioned for ground contact when said turf aeration device is deployed in an operating position, and a means to allow limited rotation of the aeration device toward or away from the pulling device, whereby said means to allow limited rotation allows said rolling means to automatically adjust to ground contours when said turf aeration device is deployed in an operating position thereby rotating said frame toward or away from an attached pulling vehicle.

10. The turf aeration device according to claim 9 wherein each said aerator mechanism includes a compressive biasing means.

* * * * *